R. R. À COURT BEADON.
FLEXIBLE SHOCK ABSORBING WHEEL AND TIRE.
APPLICATION FILED AUG. 2, 1918.
1,344,990.
Patented June 29, 1920.
2 SHEETS—SHEET 1.
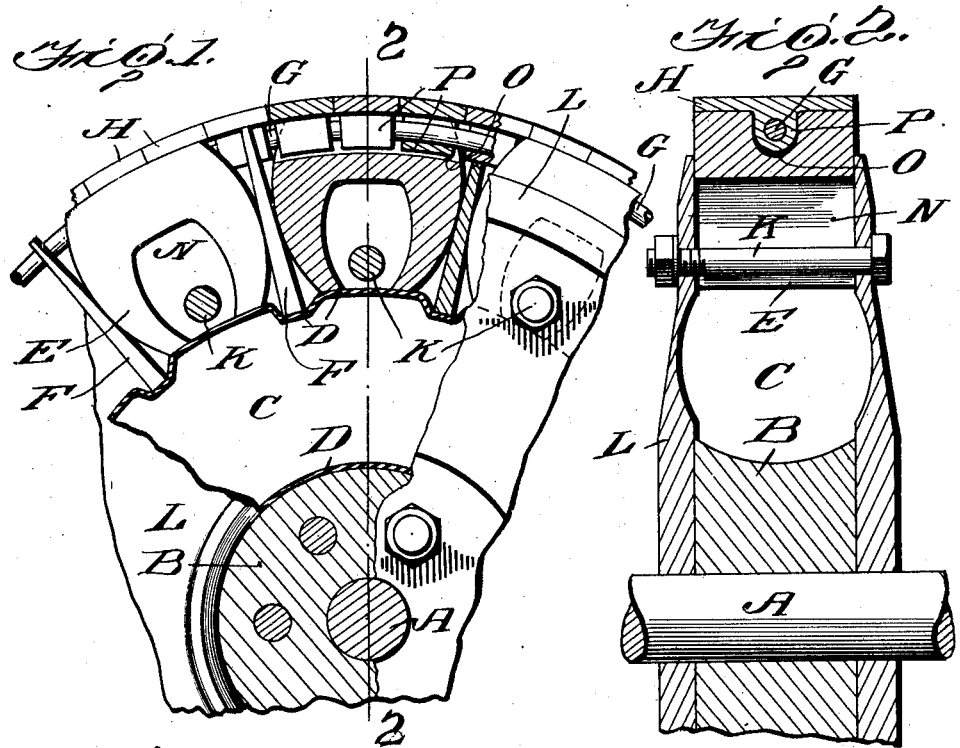
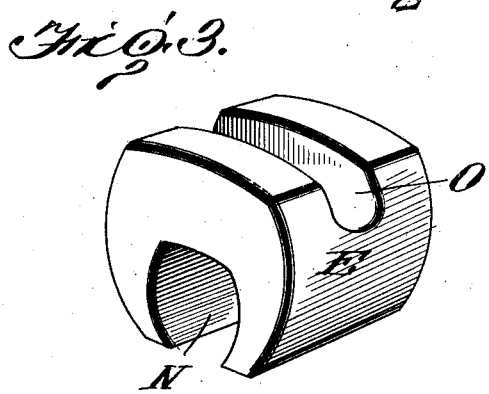
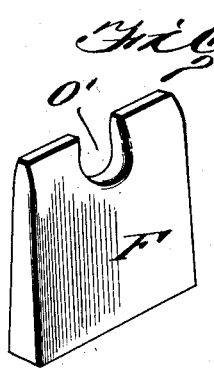
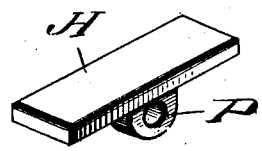
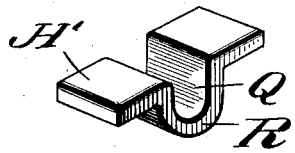
Inventor
R. R. à Court Beadon
By H. R. Kerslake
Attorney R. R. À COURT BEADON.
FLEXIBLE SHOCK ABSORBING WHEEL AND TIRE.
APPLICATION FILED AUG. 2, 1918.
1,344,990.
Patented June 29, 1920.
2 SHEETS—SHEET 2.
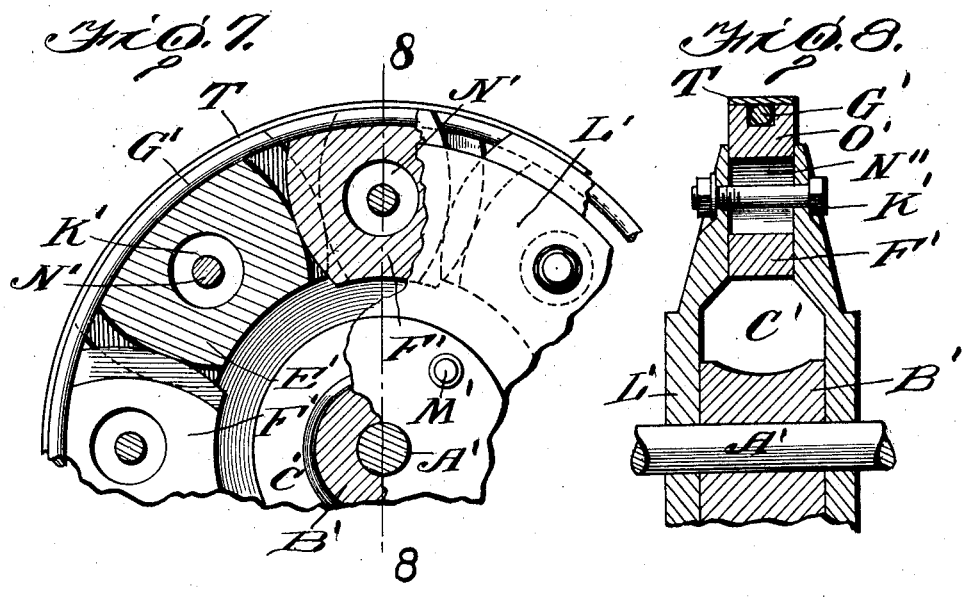
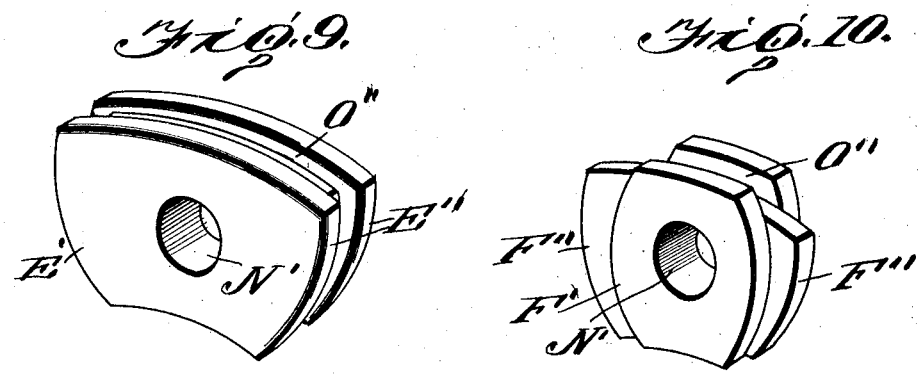
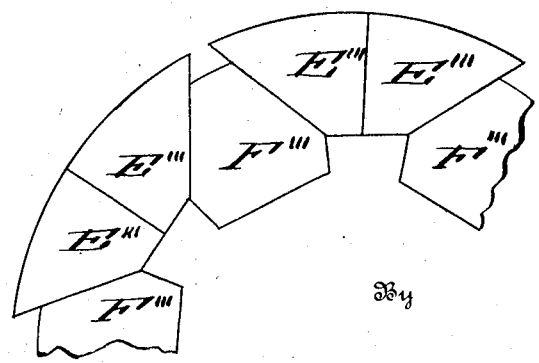
Inventor
R. R. à Court Beadon
By H. R. Kerslake
Attorney

UNITED STATES PATENT OFFICE.

RICHARD RALPH À COURT BEADON, OF SIMLA, PUNJAB, BRITISH INDIA.

FLEXIBLE SHOCK-ABSORBING WHEEL AND TIRE.

1,344,990. Specification of Letters Patent. Patented June 29, 1920.

Application filed August 2, 1918. Serial No. 248,045.

*To all whom it may concern:*

Be it known that I, RICHARD RALPH À COURT BEADON, a subject of His Majesty King George V, whose address is Ripon Place, Simla, Punjab, British India, have invented Improved Flexible Shock-Absorbing Wheels and Tires, of which the following is a specification.

This invention comprehends generally improvements in that class of invention known as resilient wheels and tires but more particularly relates to improved resilient wheels.

It is the primary aim and object of this invention to provide a device of the above mentioned character wherein grooved coöperative floating blocks and supporting and spacing members are employed in connection with a pneumatic supporting element and a flexible and non-resilient rim for the purpose of effectively absorbing shocks likely to be transmitted to the vehicle to which the wheels are connected while in addition the parts are so constructed and related as to increase the longevity thereof.

More particularly the present invention contemplates the provision of a device of the above mentioned character wherein the pneumatic supporting element, in the form of a tube, is arranged about the vehicle hub and between the side supporting plates in such manner as to yieldingly support the coöperative block and spacing members which are permitted a radial and circumferential movement when the wheels are subjected to pressure due to a heavy load while the wear on the wheels is taken up principally by the flexible but non-resilient tread surrounding the blocks and members.

Among the other aims and objects of this invention may be recited the provision of a device of the above character with a view to compactness and wherein the number of parts are comparatively few, the construction simple, the cost of production low and the efficiency high.

Other objects, as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a fragmentary elevational view of one form of the invention, partly in section.

Fig. 2 is a transverse sectional view taken on the line 2—2 in Fig. 1.

Fig. 3 is a perspective detail of one form of one of the floating blocks.

Fig. 4 is a perspective detail of one form of one of the supporting and spacing members.

Fig. 5 is a perspective detail of one of the tread sections.

Fig. 6 is a perspective detail of a modified form of tread section.

Fig. 7 is a fragmentary elevational view of another form of the invention, partly in section.

Fig. 8 is a transverse section taken on the line 8—8 of Fig. 7.

Fig. 9 is a perspective detail of another form of one of the floating blocks.

Fig. 10 is a similar view of another form of one of the supporting and spacing members, and Fig. 11 is an elevational detail of another form of floating block and supporting and spacing member arrangement.

Similar characters of reference are employed in all of the above described views, to indicate corresponding parts.

Referring, more particularly, to the accompanying drawings, especially Figs. 1 to 5 there is provided an axle A on which a hub B is mounted. The outer periphery of the hub is curved transversely while a cavity C is provided exteriorly of the hub and between the side plates of the wheel for receiving the pneumatic element in the form of a tube D, capable of being inflated through a valve (not shown) which may project through one of the side plates, as is apparent. Floating blocks E and their supporting and spacing members F in the shape of wedges with straight or curved rubbing edges are now provided and are arranged between the side plates of the wheel in pairs or alternately with respect to each other as shown in the drawings, the inner portions rubbing against the adjacent face or portion of the pneumatic tube D so as to be yieldingly supported thereby. Owing to the peculiar construction of the blocks and members they are permitted of having radial and circumferential movement in the plane of the wheel when the wheel is subjected to pressure.

The floating blocks are also provided on their outer portions with grooves O in which the cable G lies. Similar grooves O' are provided in the outer edges of the members F so that when these members are extended out as far as possible they will not jam the cable. The cable G is passed around the outside of the floating blocks E and members F and lying in the grooves O, O' in the latter cannot be displaced and this helps to constrain the blocks and keeps them in alinement.

Surrounding the blocks and retained in position by the cable is the improved sectional tread composed of a plurality of sections H. Each section consists of a tread or body portion formed on its under surface with a lug or bracket P which is engaged by the tension cable and which is also accommodated in the grooves O and O' in the blocks and members.

To retain the moving parts in proper position, as intimated side plates L L are provided. These plates are attached together by suitable fasteners or connections such as nut and bolt arrangements K K which serve to maintain the plates in properly spaced relation on opposite sides of the blocks and members, the nut and bolt arrangements being accommodated in slots N in the inner portions of the blocks and in addition to accomplishing the purpose mentioned serve to limit the excessive movement of the blocks especially when the wheel is subjected to a braking action. These side plates are of course fastened in any convenient manner to the hub or axle and are conveniently shaped so as to provide sides for the cavity C which receives the pneumatic tube as intimated.

It is to be noted that the essence of this invention is the non-resilient and flexible tread capable of taking tension and inside of which is arranged the coacting floating blocks and spacing and supporting members which are capable of movement relative to each other and which are kept forced outward by the inflated pneumatic tube.

In Fig. 6 there is a slightly modified form of tread section H' consisting of a substantially U-shaped body portion R at the terminals of the arms Q of which project the tread wings. The cable is engaged in the body portion R of the section H' and the ends are adapted to be secured together by suitable means such as a turn buckle not shown. In the other form if a turn buckle is used for connecting the ends of the cable it is to be understood that one bracket H may have its portion P made in resilient sections and engaged with the cable subsequent to the fastening thereof.

With reference to Figs. 7, 8, 9 and 10 there is employed a modified arrangement of floating blocks and spacing and supporting members. In reducing this feature of the invention to practice the sides or rubbing edges of the blocks E' are formed with spaced projecting flanges E'' which form grooves in which grooves the projecting fins F'' of the supporting and spacing members F' fit. In addition the blocks and members are provided with openings N' for accommodating the fasteners or nut and bolt arrangements K' of the side plates L'. The valve M' for inflating the pneumatic tube projects through one of the plates L'. The remaining parts are substantially the same as shown in the first form. If preferred however the sectional tread may be replaced by a continuous belt or band T of spring steel or other suitable material which is carried by the cable.

As shown in Fig. 11 the floating blocks are each composed of two substantially triangular shaped sections E''', the adjacent straight faces of which are designed to move slightly relative to each other when the wheel is subjected to pressure while a similar movement occurs between the outer slanting faces and the correspondingly shaped faces of the spacing and supporting members F''', as is apparent.

When the wheel is under no load or pressure the same will take the shape of a circle. However when under a load the tread is flattened and the wheel takes the form of an ellipse. The floating blocks adjacent to the part of the tread which is in contact with the ground and also those diametrically opposite to them tend to move inward. This forces the floating blocks on the other parts of the circumference slightly outward.

This invention may be applied to all wheels running on roads, tramlines or railways. It is especially applicable to heavy motor lorries, tractors, or to tanks and ordnance.

While revolving as an ellipse the major axis of the present wheel remains constantly parallel to the road surface or at right angles to the direction of shocks. The axle thus remains at a constant distance from the ground.

As apparent the side plates of the wheel form guides in which the floating block and spacing and supporting members may operate.

Having thus particularly described the invention what is claimed as new and desired to be secured by Letters Patent is:—

1. In a wheel of the character described, in combination, a hub, plates on opposite sides of the hub and rigid with respect thereto, a pneumatic element surrounding the hub and arranged between the plates, coöperative floating blocks and spacing and supporting members arranged between the side plates and yieldingly supported by the pneumatic element, and a flexible non-resilient tread surrounding the blocks and spacing and supporting members.

2. A device as claimed in claim 1 wherein the tread comprises a tension cable and a plurality of tread sections associated with and retained by the cable.

3. A device as claimed in claim 1 wherein the floating blocks and spacing and supporting members are arranged alternately with respect to each other so that the blocks are capable of having a riding engagement with respect to the members.

4. A device as claimed in claim 1 wherein the spacing and supporting members are of a wedge-shaped configuration while the blocks have their outer and adjacent faces curved for riding engagement with the slanting faces of the members.

5. A wheel of the character described including in combination, a hub, plates arranged on opposite sides of the hub and rigid with respect to the hub providing a cavity therebetween, fasteners for connecting the plates, a pneumatic tube surrounding the hub and arranged within the cavity provided between the plates, coacting floating blocks and spacing and supporting members arranged alternately with respect to each other and positioned between the plates so as to be yieldingly supported by the tube, the blocks being provided with slots so as to be accommodated about the fasteners, the fasteners serving to limit the excessive movement of the blocks when the wheel is subjected to a braking action, and a flexible and non-resilient tread surrounding the blocks and members.

6. A device as claimed in claim 1 wherein the tread comprises a tension cable surrounding the blocks and members, the blocks and members being provided in their outer edges with grooves, and a plurality of sections formed with portions designed to fit snugly within the grooves in the blocks and the members and to be engaged by the cable.

In testimony whereof I hereto affix my signature in presence of two witnesses, this 10 day of May 1918.

RICHARD RALPH À COURT BEADON.

Witnesses:
  F. SYLVESTER WALSH,
  C. ELGOOD.